UNITED STATES PATENT OFFICE.

CHARLES LENNIG AND JOHN B. LENNIG, OF PHILADELPHIA, PA.

PROCESS OF RECOVERING WOOL FROM MIXED FABRICS.

SPECIFICATION forming part of Letters Patent No. 259,025, dated June 6, 1882.

Application filed September 15, 1880. (No specimens.)

*To all whom it may concern:*

Be it known that we, CHARLES LENNIG and JOHN B. LENNIG, of the city and county of Philadelphia, and State of Pennsylvania, have invented a new and useful improvement in the separation of vegetable fibers used in the manufacture of mixed woolen goods for the purpose of recovering for further use the woolen particles from cuttings, worn out clothing, rags, &c, without injury, of which the following is a specification.

In carrying out this operation we use what in chemical nomenclature is called "alum mother-liquor," being the remaining profitably useless but readily crystallizable liquids from which alum crystals have, by cooling, been separated, and which consists of a mixture of free sulphuric and muriatic acids, sulphate and muriate of alumina, potash, soda, lime, and magnesia in varying proportions and unfit condition for the further manufacture of alum. To apply the same the cuttings, rags, &c., that are to be subjected to treatment are placed into wooden or lead-lined vats, of dimensions adequate to contain the quantity to be treated, and over these sufficient of the aforesaid described alum mother-liquors are poured to perfectly cover and immerse them. In this condition they are left to soak for such length of time—from one to two hours, more or less—until, on examination, it is ascertained that the woolen fabric readily separates into its fibers and falls apart. The liquid is then drawn off for further use. The remaining now readily-separating material is thoroughly washed with water until all trace of acid has disappeared, and then dried, when such material can be readily carded and brought into proper form and condition for the well-known application in woolen fabrics.

What we claim is—

The use of impure alum mother-liquors (product of the manufacture of alum) for the destructive solution and consequent separation of all vegetable fibers employed in the manufacture of mixed woolen fabrics, and the consequent recovery for use of the wool contained therein, substantially as described.

In testimony whereof we have hereunto set our hands in the presence of two subscribing witnesses.

CHARLES LENNIG.
JOHN B. LENNIG.

Witnesses:
EDWIN CORLIES,
JNO. TAYLOR.